United States Patent [19]

Guslits

[11] 4,263,825

[45] Apr. 28, 1981

[54] RECIPROCATING STROKE LENGTH ADJUSTMENT DEVICE AND METHOD

[75] Inventor: Vladimir Guslits, Rochester, N.Y.

[73] Assignee: Interpace Corporation, Parsippany, N.J.

[21] Appl. No.: 59,457

[22] Filed: Jul. 20, 1979

[51] Int. Cl.³ ............................................. F16H 35/08
[52] U.S. Cl. ........................................ 74/833; 74/127
[58] Field of Search .................. 74/58, 127, 833, 834, 74/828; 92/13.2, 13.7

[56] References Cited

U.S. PATENT DOCUMENTS

| | | | |
|---|---|---|---|
| 791,766 | 6/1905 | Furbish | 74/127 |
| 2,301,413 | 11/1942 | Kilcup | 74/127 |
| 2,521,816 | 9/1950 | Adams | 74/127 |
| 2,795,191 | 6/1957 | Seter | 92/13.7 |
| 3,818,806 | 6/1974 | Fumagalli | 92/13.2 |

FOREIGN PATENT DOCUMENTS

| | | | |
|---|---|---|---|
| 1053933 | 3/1959 | Fed. Rep. of Germany | 92/13.7 |
| 495040 | 6/1919 | France | 74/127 |
| 20408 | of 1911 | United Kingdom | 74/127 |

*Primary Examiner*—Lawrence J. Staab
*Attorney, Agent, or Firm*—Charles E. Baxley

[57] ABSTRACT

The adjustment screw that regulates the stroke length of the piston that drives a diaphragm pump is rotated by means of a clutch and "diamond-back" screw structure. By selectively engaging either of two oppositely oriented one-way clutches, one of two respective associated nuts that ordinarily rotate freely on the "diamond-back" screw is blocked from rotation when the screw moves longitudinally in one direction. Thus locked, the nut compels the "diamond-back" screw to rotate, thereby turning the adjustment screw with which it is connected in order to produce the desired increase in piston stroke length.

9 Claims, 2 Drawing Figures

RECIPROCATING STROKE LENGTH ADJUSTMENT DEVICE AND METHOD

TECHNICAL FIELD

The invention relates to reciprocating stroke length adjustment methods and apparatus and, more particularly, to a brake with overriding clutch and "diamond-back" screw combination for regulating metering pump output, and the like.

BACKGROUND ART

Frequently, in chemical processes as well as in other applications, metering pumps are particularly useful. Pumps of this nature often have a diaphragm, one side of which is in direct contact with the fluid that is to be pumped. On the other side of the diaphragm, hydraulic pressure pulses produced by a piston pump cause the diaphragm to flex. The diaphragm produces both a depth or range of flexure and a flexing frequency that is predetermined through the operation of the piston pump. In these circumstances, the diaphragm positively displaces the fluid being pumped as a consequence of this flexing, the volume output from the diaphragm pump being directly related to the range and speed of the piston pump travel of the pump to which it is coupled. Clearly, the capacity of a metering pump is subject to regulation, in large measure, through the control of the driving hydraulic piston pump.

One technique for regulating metering pump capacity through the operation of the hydraulic piston pump is to control the length of the piston's stroke. Illustratively, a motor driven connecting rod is not coupled directly to a wrist pin in the piston in the manner that usually characterizes most fixed displacement reciprocating piston pumps. The connecting rod in this instance is pivotally connected to a tubular housing which swings in an oscillatory fashion due to the influence of said connecting rod. One end of a second connecting rod joins a threaded adjustment screw to a wrist pin within a slide block. Turning the adjustment screw within the oscillating housing shortens or lengthens the linear stroke of the piston by decreasing or increasing the distance from the housing oscillitory axis to the wrist pin, which joins the connecting rod at the adjustment screw, to the pivot point of the oscillating housing. It is, of course, this selective control of the length of the piston stroke that determines a particular output from the piston pump and hence the immediate metering pump output.

In order to enable the adjustment screw to be turned to regulate the piston stroke length, it is usual to mount one end of the screw in the housing. A driven gear in a pair of bevel gears is fixed to the mounted end of the adjustment screw. The driving bevel gear, moreover, is rotated in response to the operation of a shaft which has one fixed universal joint, an oscillating universal joint and a slip shaft. Thus, rotation of the shaft has, through the meshed bevel gears, the net effect of rotating the adjustment screw, and thereby effectively increasing or decreasing the piston stroke. This particular combination establishes a linear or directly proportional relationship between the rotation of the shaft and the change in piston stroke length through the complete range of metering pump capacity range.

The motion of the oscillating housing during pump operation produces a certain amount of reciprocating linear movement of the universally jointed shaft. The slip joint on the shaft absorbs this reciprocating motion to enable a manually operated handwheel to provide the necessary shaft rotation and pump output adjustment. Adjustment during the discharge cycle of the piston pump's stroke requires a great deal of force. The force required in larger capacity metering pumps moreover, being so great that manual adjustment becomes awkward.

Pneumatic, electric and hydraulic devices also have been developed to provide an automated system of pump capacity adjustment. These pneumatic, electric and hydraulic systems, are relatively expensive and require a separate electric, pneumatic or hydraulic motor or pneumatic or hydraulic cylinder, or the like for rotating the shaft or moving the slide block a suitable amount to produce a desired metering pump output.

Accordingly, there is a need for a reliable and inexpensive means for adjusting the capacity of a metering pump.

It is thus an object of this invention to provide a reliable and relatively inexpensive technique for regulating metering pump output without the need for excessive external power.

SUMMARY

These and other problems of the prior art are overcome, to a great extent, through the practice of the invention. Typically, the end of the shaft that protrudes through the wall of the gear box has a shank with a "diamond-back" or "Yankee" threaded screw. A screw of this nature has right-handed and left-handed high pitched threads or grooves cut into its surface. The lands, or bosses, that are formed between the criss-crossing thread grooves have diamond shapes, and hence, the basis for the name "diamond-back" screw that has been applied to this mechanical device.

This "diamond-back" thread, with either of a pair of followers or nuts that ride in oppositely oriented grooves held stationary, will rotate clockwise and counter-clockwise during its linear reciprocating motion.

In accordance with the invention, a one-way clutch and brake combination is provided to selectively restrict the rotation of the appropriately threaded nuts on the protruding shank. When a brake for one of these nuts is energized, rotation of the threaded nut in one direction is prevented, thereby compelling the threaded shank to rotate during one half of the linear reciprocating motion. During the return half of the reciprocating motion, opposite rotation is prevented by the action of the one-way clutch. This shank rotation, in turn, provides the necessary turning of the adjustment screw that produces the desired increase or decrease in the stroke length of the piston pump which then determines the overall metering pump output. Clearly, there is no need for a slip joint on the shaft to absorb reciprocating motion in that this reciprocating motion is converted into useful work according to the principles of the invention. Brake operation, to produce the foregoing result, can be achieved in any number of ways, although electrical and pneumatic operation is often to be preferred for most industrial application.

Along with the economy and reliability that characterizes this invention, it should be noted that the force required to adjust the pump output during the pump discharge cycle is eliminated. The invention applies the adjustment to the shaft during the suction cycle of the pump, thereby using much less force to achieve an equivalent change. Illustratively, for the same pump output adjustment in the prior art a power of 230 watts is required while, in contrast, the present invention requires an expenditure of only 23 watts.

In these circumstances, a separate motor or pneumatic cylinder is not required to provide this adjustment and hence, a further economy is achieved through the practice of the invention.

Although for descriptive purposes, the invention is described in connection with reciprocating metering pump structure, an important aspect of the invention is the ability to adjust the length of a reciprocating stroke in an efficient and simple manner. Consequently, the invention is not limited to pump application, but is limited only through the scope of the claims appended hereto.

DETAILED DESCRIPTION OF THE PREFERRED EMBODIMENTS

Figure 1:
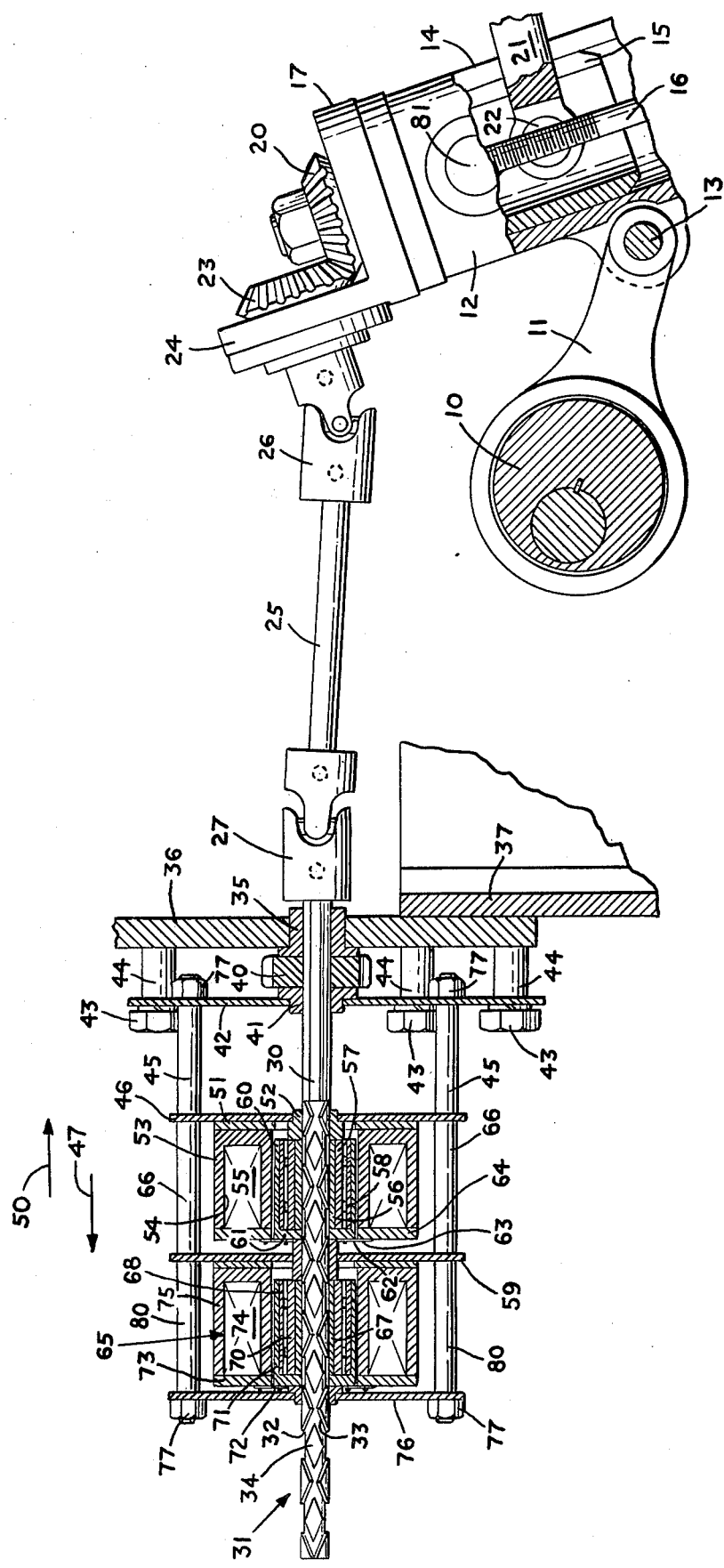
FIG. 1 of the drawing shows a front elevation in broken section of a typical embodiment of the invention.

Referring to FIG. 1, an eccentric 10 is driven through a worm wheel (not shown) and worm gear (not shown) that are coupled to a motor (not shown) to drive a connecting rod 11. The driving connection rod 11, which is driven by the eccentric 10, is joined to a housing 12 by means of a pivot pin 13. The housing 12 has a hollow cylindrical shape that accommodates a slot 14 on the side of the housing that is opposite from the pivot pin 13.

Within the housing 12 a slide block 15, which also has a slot that is in alignment with the housing slot 14, encloses a threaded adjustment screw 16. The adjustment screw 16 is rotatably mounted in a transversely disposed gear block 17 on the housing 12. A driven bevel gear 20 is fixed to the adjustment screw 16 to enable the adjustment screw to rotate with the driven bevel gear.

A bifurcated end of a driven connecting rod 21 protrudes through the housing slot 14 and the aligned slide block slot to embrace a portion of the threaded shank of the adjustment screw 16. Within the end of the connecting rod 21, a pin 22 is threaded to the adjustment screw 16. Thus, as the adjustment screw 16 is rotated, the connecting rod 21 is drawn along the shank of that screw by pin 22. In addition, the connecting rod 21 pivots about the pin 22 to adjust to changes in the relative angle between the centerlines of the adjustment screw and the connecting rod 21, and, also to changes in angle caused by the operation of the pump. Although it is not shown in the drawing, the other end of the connecting rod 21 is joined to the wrist pin within the crosshead of the hydraulic piston pump.

The driven bevel gear 20 meshes with a drive bevel gear 23. A journal block 24 on the gear block 17 journals the drive bevel gear 23 to permit the axes of the gears 20, 23 to intersect and thus establish a proper meshed relationship.

A shaft 25 for the gear 23 is provided with two universal joints 26, 27. This combination of the shaft 25 and the universal joints enables the shaft and gears 20, 23 to respond to the movement of the housing 12 during pump operation when being driven by the eccentric 10. The universal joint 27 is connected to a shank 30. The end of the shank 30 that is adjacent to the universal joint 27 has a square or hexagonal cross-section for pump adjustment position indicia, as described subsequently in detail. The major portion of the opposite end of this shaft, however, has a double thread "diamond-back" screw 31.

As illustrated in FIG. 1 of the drawing, the screw 31 has right-hand and left-hand thread grooves 32, 33 that form a criss-cross pattern on the surface of the shank 30. These grooves 32, 33 moreover, also form diamond shaped lands 34, the operation of which will be described subsequently in more complete detail. A bearing 35 supports the universal shaft end of shank 30 in a mounting plate 36. The mounting plate 36 is, in turn, secured to a metering pump 37. An instrumentation gear 40 is provided to rotate the operation status and control equipment (also not shown). In this instance, it is the square or hexagonal cross-section of the shank 30 which fixes the angular position of the gear 40 with respect to the shank in order to identify the rotational position of the shank.

As illustrated, the instrumentation gear 40 is interposed between the bearing 35 and a bearing 41 that is mounted in a flat plate 42. Bolts 43 and spacers 44 secure the plate 42 a predetermined distance from the parallel mounting plate 36. The flat plate 42 supports a perpendicularly disposed set of long, cylindrical spacers 45. These cylindrical spacers establish the relative longitudinal position of a support plate 46. The support plate 46 also is parallel to the flat plate 42 and the mounting plate 36.

A brake foundation plate 51 is fastened to the support plate 46, both of the plates 46, 51 having centrally disposed apertures that are concentric with the "diamond-back" screw 31. A sliding contact bearing 52, is further interposed between the support plate 46 and the screw 31.

The foundation plate 51 has a hollow cylindrical brake housing 53 secured to its surface. The brake housing is provided with a cylindrical recess 54 in which a solenoid, or electromagnet winding 55 is nested. The longitudinal axes of the brake housing 53, the cylindrical recess 54 and the solenoid 55 within that recess coincide with the longitudinal axis of the shank 30 and its associated "diamond-back" screw 31.

As shown in the drawing, the inner wall of the brake housing 53 is spaced from the surface of the "diamond-back" screw 31. Within the space thus provided, a follower or nut 56 engages the right hand thread 32 of the "diamond-back" shaft 31. The nut 56 is pressed into a sleeve 57.

This nut and sleeve assembly rotates within a one-way clutch 58. Typically a one-way clutch that permits independent rotation of the nut and sleeve assembly 56, 57 in one direction only is described in detail in the Torrington Company Catalog RC-8 titled "Torrington Inch and Metric Series Drawn Cup and Roller Clutches" (The Torrington Company, Torrington, CT 06790). For this purpose, however, any number of mechanical devices are suitable. Illustratively, a spring-biased "click", a ratchet and the like also could be used. The one-way clutch 58 is pressed into a clutch housing 60 which has a radial flange 61 to which a spring 62 is rigidly attached by rivets, screws, or other suitable means 63. Consequently, as the nut and sleeve assembly 56, 57 rotate in either a clockwise or counter-clockwise direction in response to linear reciprocating motion of the "diamond-back" screw 31, the particular direction of rotation that is contrary to that which the one-way clutch 58 will permit, will cause the one-way clutch and cluch housing assembly 58, 60 to rotate as a unit with the nut and sleeve assembly 56,57.

An annular armature 64 also is attached to the flat spring 62 in alignment with the end of the solenoid 55. In these circumstances, with the solenoid 55 deenergized, the armature 64, flat spring 62, clutch housing 60, and one-way clutch 58, as a unit, are free to rotate in either a clockwise or counter-clockwise direction if compelled by the nut and sleeve assembly 56,57.

A second support plate 59 is spaced longitudinally from the armature 64, flat spring 62 and flange 61 by means of spacers 66. An almost identical electromagnetic brake mechanism 65 to that which has been described above is affixed to the second support plate 59. The salient differences, however, that characterize the brake 65 are the left-handed follower or nut 67 which rides in the left-handed thread groove 33 and the direction of action one-way clutch 71. These differences cause the nut 67 and its sleeve 70, the one-way clutch 71, the spring 72 and armature 73 to rotate in a direction that is opposite to the direction of rotation of the armature 64 and nut 56 for any given longitudinal movement of the screw 31 in the direction of the arrow 47 or the arrow 50. The one-way clutch 71, moreover, blocks independent rotation of the clutch housing 68 and brake armature 73 in a direction that is opposite to the direction which is blocked by the one-way clutch 58. Furthermore, both one-way clutches 58, 71 do not transmit angular rotation to the respective clutch housings 60, 68 during linear motion of the "diamond-back" screw 31 in the direction of the arrow 47. Note in this respect that the armature 73 also is in alignment with the exposed end of a cylindrical electromagnet winding or solenoid 74 that is nested within a brake housing 75.

The end of this entire clutch assembly is braced by means of a support plate 76 that is secured by means of nuts 77 and spacers 80.

In operation, the housing 12 oscillates about a point 81 in response to the movement of the driving connecting rod 11. Consequently, the shank 30 reciprocates longitudinally in the directions of the arrow 47, 50.

In this situation, the nut 56 and its associated sleeve 57 rotate in alternate clockwise and counter-clockwise directions as the nut is driven by the groove 32 in the "diamond-back" screw 31. Similarly, the nut 67 and its respective sleeve 70 rotate in counter-clockwise and clockwise directions, opposite to those of the nut 56 and sleeve 57, for any given longitudinal movement direction of the shank 30. Thus, with the solenoids 55 and 74 deenergized, the nuts 56, 67 rotate freely within the respective armatures 64, 73 in response to longitudinal motion in the direction of arrow 50 of the "diamond-back" screw. This condition does not cause the shaft 25 to rotate and hence does not produce any change in the linear stroke of the driven connecting rod 21 because the adjustment screw 16 is not rotated.

Upon energizing the solenoid 55, however, the armature 64 becomes stationary under the magnetic force that the solenoid establishes. As the shank 30 moves longitudinally in the direction of the arrow 47, both of the nuts 56 and 67 turn in opposite directions. Nuts 56, 57 turn because the respective one-way clutches 58, 71 allow this rotation. This motion of the shank 30 in the direction the arrow 47 corresponds to the discharge stroke of the pump, (not shown on the drawing).

On the suction stroke of the pump, the shank 30 moves longitudinally in the direction of the arrow 50. During this longitudinal movement, the nut 67 that is associated with the deenergized solenoid 74 continues to rotate, except that the rotation now is in the opposite direction and compels with it the rotation of the one-way clutch 71. The one-way clutch 58 now in rigid combination with the magnetically engaged armature 64 prevents the nut 56 from rotating. In this condition, the "diamond-back" screw 31 and its shank 30 is forced to rotate. Clearly, the rotation of the shank 30 is transmitted through the shaft 25 and the bevel gears 23, 20 to produce a rotation of the adjustment screw 16. This rotation of the screw 16 causes the driven connecting rod 21 to advance along the adjustment screw in order to produce a desired change in the stroke length of the connecting rod 21.

By deenergizing the solenoid 55 and energizing the solenoid 74, rotation of the nut 67 is prevented in the opposite direction during movement of the shank 30 in the direction of the arrow 50. This produces a rotation of the shaft 25 and the adjustment screw 16 in a direction opposite to that which the energized solenoid 55 had provided. Thus, to increase or to decrease the metering pump output by lengthening or shortening the linear stroke of the driven connecting rod, it is only necessary to selectively energize either of the solenoids 55, 74. Thus, through the practice of the invention, the reciprocating movement of the shank 30 now is converted into a desired rotation of the shaft 25 without imposing a need for a separate drive motor, large expenditure of power or the like.

Figure 2:
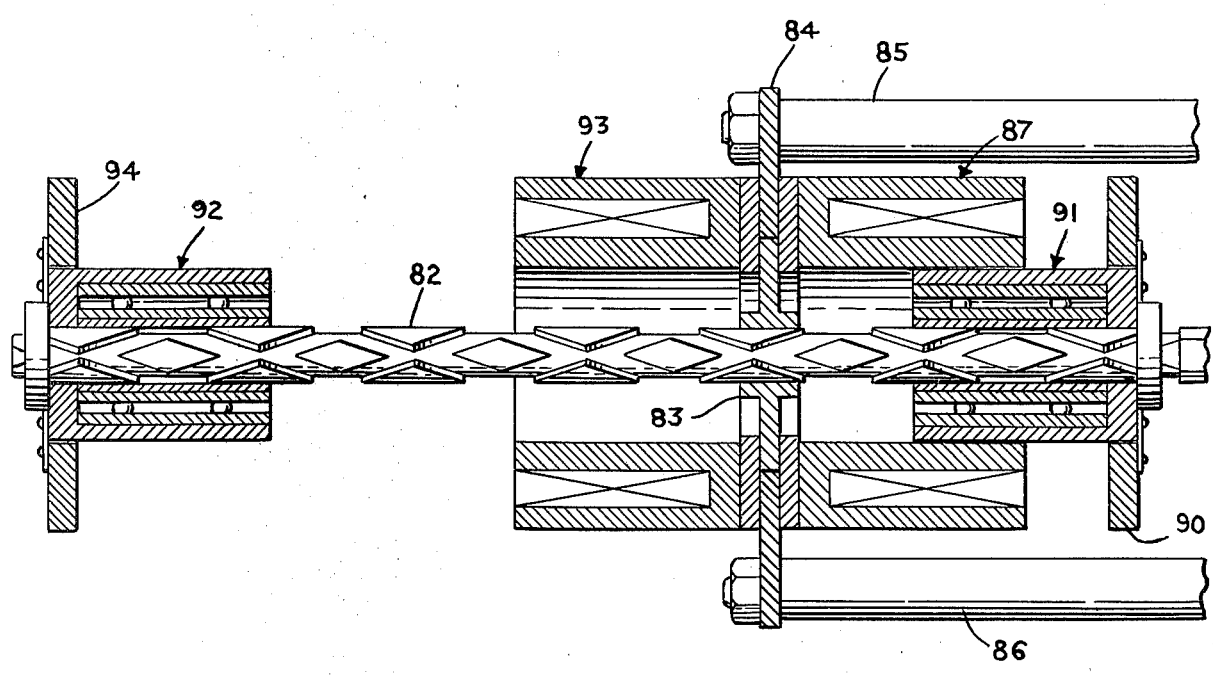
FIG. 2 is a detail view in full section of another embodiment of the invention.

A further embodiment of the invention is shown in FIG. 2. Illustratively, a "diamond-back" screw 82 is supported for longitudinal movement in a bearing 83 that is mounted on a transversely disposed plate 84. The plate 84, in turn, is secured to the rigid mounting plate (not shown in FIG. 2) by means of spacers 85, 86. A brake 87, that is electromagnetically activated in the manner described with respect to the embodiment of the invention that is shown in FIG. 1, selectively engages an armature 90 on a one-way clutch, and its associated assembly, that are mounted on the "diamond-back" screw 82, and aside from the periods of selective magnetic engagement with brake 87, moves with the screw. Consequently, as the screw 82 reciprocates in a longitudinal direction, there is no relative movement between the one-way clutch 91 and the screw. In this manner, wear on the clutch and the screw is reduced substantially. When the brake 87 is energized, however the armature, clutch housing, one-way clutch, sleeve and nut are prevented from rotation in a manner similar to that previously described. In these circumstances, the brake and one-way clutch assembly impart a rotational motion to the diamond back screw 82 in the same manner as described for FIG. 1.

In a similar manner, a second one-way clutch and follower nut arrangement is mounted on the extreme end of the "diamond-back" screw 82 in order to travel with the screw in its reciprocating motion. An electromagnetically activated brake 93 which is also rigidly mounted on the plate 84, selectively engages an armature 94 to compel the "diamond-back" screw to rotate in a direction that is opposite to the direction imparted by the brake 87.

Thus, the embodiment of the invention that is shown and described with respect to FIG. 2 has the further advantage of significantly reducing wear on a number of components.

It should be further noted that an electromagnetic brake mechanism is not essential to the practice of the invention. Any suitable brake system, pneumatic, hydraulic and the like may be adapted to the "diamondback" screw structure that provides the desired rotation of the shaft 25. Likewise, the one-way clutch could be a wrapped spring device or an electromagnetic or pneumatic clutch. As a further embodiment of the invention, two separate shanks can be provided, each with its respective, oppositely oriented thread. In this circumstance, each of the shanks would be in engagement with only one of the clutch and brake mechanisms.

The embodiments of the invention in which an exclusive property or privilege is claimed are defined as follows:

1. An apparatus for rotationally adjusting a reciprocating rod stroke length comprising a rotatable double thread shank, two rotating thread followers on said shank, each rotatable in opposite directions each in response to a respective one of the threads a brake for selectively arresting the rotation in one direction only of one of the thread followers, thereby compelling the shank to rotate and an adjustment screw coupled to said shank and the rod for rotation with said shank in order to adjust the stroke length of the reciprocating rod.

2. A method for rotationally adjusting a reciprocating rod with a rotatable double thread shank comprising the steps of rotating two thread followers on the shank in opposite directions, each in response to a respective one of the threads, selectively arresting the rotation of one of the thread followers thereby forcing the shank to rotate, rotating an adjustment screw coupled to said shaft and to the rod in order to adjust the stroke length of the reciprocating rod.

3. Apparatus for adjusting the stroke length of a reciprocating member comprising a connecting rod, a rotatable adjustment screw coupled to an end of the connecting rod for regulating the length, gear means for rotating the adjustment screw, a shaft connected to the gear means for driving the gear means and adjusting screw, shank means connected to the shaft for reciprocating motion, said shank means having two oppositely oriented threads formed thereon, a first follower engaged in one of the threads and rotatable in response to movement of the respective thread, a one-way clutch enabling the first follower to rotate freely in one direction and to rotate with the clutch in another direction of rotation, a second follower engaged in the other of the threads and rotatable in response to movement of its respective thread, another one-way clutch enabling the second follower to rotate freely in a direction opposite to the direction of free rotation of the first follower and to rotate with its respective clutch in the free direction of rotation of the first follower, and brake means for selectively arresting the rotation of the clutches, thereby compelling the shank means to rotate and to regulate the piston stroke.

4. Apparatus according to claim 3 wherein the brake means comprises a pair of solenoids, hydraulic or pneumatic cylinders being individual to a respective one of the clutches for selectively arresting the rotations of the clutches.

5. Apparatus according to claim 4 wherein said brakes each respectively comprise a flange, an armature for magnetic attraction to the flange, and a spring for joining the armature to the flange.

6. Apparatus according to claim 5 further comprising a housing for mounting the adjustment screw to provide a journal for the gear means, the housing having a slot formed therein to accommodate the connecting rod.

7. Apparatus according to claim 6 further comprising a driving connecting rod for imparting motion to the housing and a pivot on the housing for coupling the driving connecting rod thereto.

8. Apparatus according to claim 3 further comprising a mounting plate, a further plate parallel with said mounting plate and transverse to said shank means, said further plate being rigidly secured to and spaced from said mounting plate, said brake means also being secured to said further plate means and said clutches being movable with said shank means relative to said brake means to enable said brake means to selectively arrest the motion of either of said clutches.

9. A method for adjusting the stroke length of a reciprocating member comprising the steps of imparting a reciprocating motion to a rotatable shank means having oppositely oriented threads in a longitudinal direction, rotating two thread followers on the shank means in opposite directions each in response to a respective one of the threads, selectively arresting the rotation of one of the thread followers thereby forcing the shank means to rotate, coupling the threaded shank means rotation to a rotatable adjustment screw in order to increase and decrease the stroke length of a reciprocating member that is attached thereto a predetermined amount.

* * * * *